United States Patent
Pearmain et al.

(10) Patent No.: US 11,574,207 B2
(45) Date of Patent: Feb. 7, 2023

(54) PROXIMAL FACTORIZATION MACHINE INTERFACE ENGINE

(71) Applicant: Oracle International Corporation, Redwood Shores CA, CA (US)

(72) Inventors: Michael Edward Pearmain, Guildford (GB); Janet Barbara Barnes, Yalding (GB); David John Dewsnip, Hampshire (GB); Zengguang Wang, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1521 days.

(21) Appl. No.: 15/706,471

(22) Filed: Sep. 15, 2017

(65) Prior Publication Data

US 2018/0082191 A1 Mar. 22, 2018

Related U.S. Application Data (60) Provisional application No. 62/395,857, filed on Sep. 16, 2016.

(51) Int. Cl.
*G06N 5/02* (2006.01)
*G06N 7/00* (2006.01)
(Continued)

(52) U.S. Cl.
CPC ........ *G06N 5/025* (2013.01); *G06F 16/3334* (2019.01); *G06F 16/9535* (2019.01); *G06K 9/6269* (2013.01); *G06N 7/005* (2013.01); *G06N 20/00* (2019.01)

(58) Field of Classification Search
CPC ........ G06N 5/025; G06N 20/00; G06N 7/005; G06F 16/9535; G06F 16/3334; G06K 9/6269
See application file for complete search history.

(56) References Cited

U.S. PATENT DOCUMENTS 6,981,040 B1  12/2005  Konig et al.
7,660,705 B1  2/2010  Meek et al.
(Continued)

OTHER PUBLICATIONS

Yan et al., "E-Commerce Item Recommendation Based on Field-aware Factorization Machine", Sep. 16-20, 2015, ReeSys '15 Challenge: Proceedings of the 2015 International ACM Recommender Systems Challenge, pp. 1-4. (Year: 2015).*
(Continued)

*Primary Examiner* — Ying Yu Chen
(74) *Attorney, Agent, or Firm* — Invoke (57) ABSTRACT

Techniques are described for training and evaluating a proximal factorization machine engine. In one or more embodiments, the engine receives a set of training data that identifies a set of actions taken by a plurality of users with respect to a plurality of items. The engine generates, for a prediction model, (a) a first set of model parameters representing relationships between features of the plurality of users and the set of actions, and (b) a second set of model parameters representing interactions between different features of the plurality of users and the plurality of items. For each respective item in a plurality of items, the engine computes a probabilistic score based on the model parameters. The engine selects and presents a subset of items based on the probabilistic scores.

20 Claims, 7 Drawing Sheets

(51) Int. Cl.
*G06K 9/62* (2022.01)
*G06N 20/00* (2019.01)
*G06F 16/33* (2019.01)
*G06F 16/9535* (2019.01)

(56) References Cited

U.S. PATENT DOCUMENTS

| | | | |
|---|---|---|---|
| 7,933,762 | B2 | 4/2011 | Pinto et al. |
| 8,170,841 | B2 | 5/2012 | Pinto et al. |
| 8,938,463 | B1 | 1/2015 | Kim et al. |
| 10,235,403 | B2 * | 3/2019 | Rossi ............... G06Q 30/02 |
| 10,509,791 | B2 * | 12/2019 | Jeon ............ G06F 16/24578 |
| 2015/0381552 | A1 * | 12/2015 | Vijay ................. H04L 43/08 709/206 |
| 2016/0371589 | A1 * | 12/2016 | Golbandi ............... G06N 5/04 |
| 2017/0140041 | A1 * | 5/2017 | Dotan-Cohen ...... G06F 16/335 |
| 2017/0186029 | A1 * | 6/2017 | Morris .............. G06Q 30/0243 |

OTHER PUBLICATIONS

Ta et al. ("Factorization Machines with Follow-the-Regularized-Leaderfor CTR prediction in Display Advertising"), 2015, 2015 IEEE International Conference on Big Data (Big Data), pp. 2889-2891. (Year: 2015).*

Oentaryo et al., "Predicting Response in Mobile Advertising with Hierarchical Importance-Aware Factorization Machine", Feb. 2014, WSDM '14: Proceedings of the 7th ACM international conference on Web search and data mining, pp. 123-132. (Year: 2014).*

Jiang et al., "Scaling-up Item-based Collaborative Filtering Recommendation Algorithm based on Hadoop", 2011, 2011 IEEE World Congress on Services, pp. 490-497. (Year: 2011).*

Chu et al., "Personalized Recommendation on Dynamic Content Using Predictive Bilinear Models", 2009, WWW'09: Proceedings of the 18th international conference on World wide web, pp. 691-700. (Year: 2009).*

Rendle et al., "Factorization Machines with libFM", May 2012, ACM Transactions on Intelligent Systems and Technology, vol. 3, No. 3, Article 57, pp. 57:1-57:22. (Year: 2012).*

McMahan et al., Ad Click Prediction: a View from the Trenches, Proceedings of the 19th ACM SIGKDD International Conference on Knowledge Discovery and Data Mining (KDD) (2013).

Factorization Machines, Steffen Rendle, Department of Reasoning for Intelligence, the Institute of Scienti?c and Industrial Research, Osaka University, Japan.

Anh-Phuong, Factorization machines with follow-the-regularized-leader for CTR prediction in display advertising, 2015 IEEE International Conference on Big Data (Big Data), pp. 2889-2891.

* cited by examiner

PROXIMAL FACTORIZATION MACHINE INTERFACE ENGINE

BENEFIT CLAIMS; RELATED APPLICATIONS; INCORPORATION BY REFERENCE

This application claims the benefit of U.S. Provisional Patent Application 62/395,857, filed Sep. 16, 2016, which is hereby incorporated by reference.

TECHNICAL FIELD

The present disclosure relates to machine learning techniques for optimizing the configuration and flow of interfaces.

BACKGROUND

Machine-learning techniques often involve training and evaluating predictive models to optimize system behavior in some way. For example, a predictive model may attempt to determine the probability of a given event, such as the selection of an interface icon or the execution of a function, given the most recent information available about a system user. Effective predictive models generate the most accurate predictions possible from a given set of training data, which in some cases may be sparse in nature. Many applications also benefit from prediction models that have relatively low memory footprints and produce results in the least amount of time. Effective predictive models may enhance the user experience, streamline navigation, and reduce system overhead.

One approach to generating a prediction model is to use linear regression. According to this approach, a model is generated by fitting a line to a training dataset comprising values for an explanatory variable and corresponding values for a dependent variable. For example, the explanatory variable in the training dataset may embody different values for a user attribute, denoted x. The set of dependent variables may capture whether the system user performed or did not perform a particular action, denoted y. Once trained, the linear regression model may be evaluated to predict the probability that a given user with a particular attribute value for x will perform action y.

In many cases, linear regression models are ineffective. One reason is that linear regression models do not capture higher-order dependencies between different explanatory variables. For example, a user attribute may not only have an impact on a given event y, but may also influence the values of one or more additional explanatory variables that also have a relationship with the outcome for event y. By failing to capture these higher-order dependencies, the linear regression model may produce inaccurate predictions.

Linear regression models also rely on an assumption that the values for the dependent variable lie somewhere within a continuous or near-continuous range. However, some applications are directed to predicting the outcome of a binary event. These applications may be thought of as attempting to solve a binary classification problem in which the target value of dependent variable y can take one of two values, such as a 0 and a 1. Because there are only two possible outcomes rather than a continuous range of values, linear regression models are generally ineffective for optimizing system behavior in these applications.

Other predictive models have been developed and tailored to specific optimization problems, including the binary classification problem. However, many of these models have high memory overhead and/or slow evaluation times. In other cases, model accuracy is sacrificed at the expense of runtime response times. Thus, many developers are left to make a choice between more accurate prediction models and more efficient prediction models.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Techniques are described herein that provide for an efficient and accurate prediction analytic that may be evaluated to determine the probability of a given event based on the current context of a system user. In one or more embodiments, the techniques are implemented to present, through an interface, interactive items that a user is most likely to click on or otherwise select. With an efficient and accurate presentation, the user experience may be streamlined and otherwise enhanced. For example, the presentation may allow the user to access items without the need to navigate cumbersome menus, which may be multiple levels deep. In another example, the user may be presented with items of which the user was previously unaware and that extend system functionality in a manner optimized for the user. Additionally or alternatively, the user may be presented with reports, recommendations, or other content which the user is most likely to find relevant.

In one or more embodiments, an interface engine combines multiple prediction models (or model components) into a single combined model or engine, which is used to select and present interface items. The model components that are combined may include linear and nonlinear prediction components. The linear component of the model is trained to represent single-order (i.e., linear) relationships between feature vectors and event outcomes (also referred to herein as actions). The nonlinear component, on the other hand, is trained to capture higher-order dependencies or interactions between different feature vectors. By combining the different types of model components, the interface engine may account for both linear and nonlinear interactions between feature sets, leading to more accurate predictions.

In one or more embodiments, a factorization machine is used to model higher-order dependencies between different features. As previously indicated, these higher-level dependencies are not detected automatically by linear models, such as logistic-regression models. By accounting for interactions between different features, factorization machines may produce more accurate predictions than linear models for complex applications.

Factorization machines further allow parameter estimation under very sparse data. One reason is that factorization machines allow weights to be assigned to interactions between features that have not been previously encountered in historical observations. As a result, factorization machines may be implemented to quickly evaluate new users and items, mitigating the problems of cold starts encountered by some prediction models. Cold starts refer to a class of problems that occur in prediction engines that are unable to draw inferences from new users and/or items until sufficient information has been gathered.

Another advantage of factorization machines, as described further below, is the ability to model high-order feature interactions with linear complexity. The sparse nature and linear complexities of factorization machines provide high scalability of the model parameters. Consequently, factorization machines may be efficiently trained over large data sets with a relatively low storage footprint.

In one or more embodiments, model parameters are updated based on recorded interactions that capture clickstream data, user information, and item metadata. Model parameters may be updated using Follow-The-Regularized-Leader (FTRL-Proximal) to minimize a regularized loss function, as described in further detail below. The FTRL-Proximal regularization model is effective at generating sparse models with fast convergence rates, allowing for efficient updates, both in terms of memory and performance. FTRL-Proximal also allows for different learning rates among different model parameters, which may also yield more accurate predictions and faster convergence rates. Model updates may be performed offline and/or in batch mode to minimize runtime evaluation response times.

Once trained, the prediction model may be evaluated to select interface items to present to a particular user that is accessing the system. In one or more embodiments, evaluating the prediction model includes generating a user feature vector based on a set of features associated the user. The set of features may be extracted from clickstream data and/or other attributes associated with the user that provide a current user context. A set of item feature vectors may also be generated for a set of interface items that are candidates for being presented to the user. The item feature vectors may be computed based on attributes associated with each item. The user and item feature vectors may be formed by mapping extracted features to an index in a hash space. This technique minimizes memory overhead for the feature vectors and allows for quicker evaluation times.

After the feature vectors have been obtained, the prediction model is evaluated to determine a probability that a user will interact with each item in the set of interface items. The set of probability may be computed in a vector-wise fashion by combining the user feature vector with the item feature vectors and applying the model parameter weights. This technique avoids the need to build and compute a full matrix of user and product features by performing a union operation, which may slow response times. Rather, the feature vectors may be combined by computing an inner dot product, allowing for multiple interface items to be evaluated in a fraction of the time that would be involved in forming and analyzing the full feature matrix.

Based on the evaluation, the interface engine selects and presents a subset of the evaluated interface items to the user. For example, the interface engine may select the top-n interface items as determined by the computed probabilities. The presented interface items may be interactive to streamline navigation and system operations.

2. System Architecture

Figure 1:
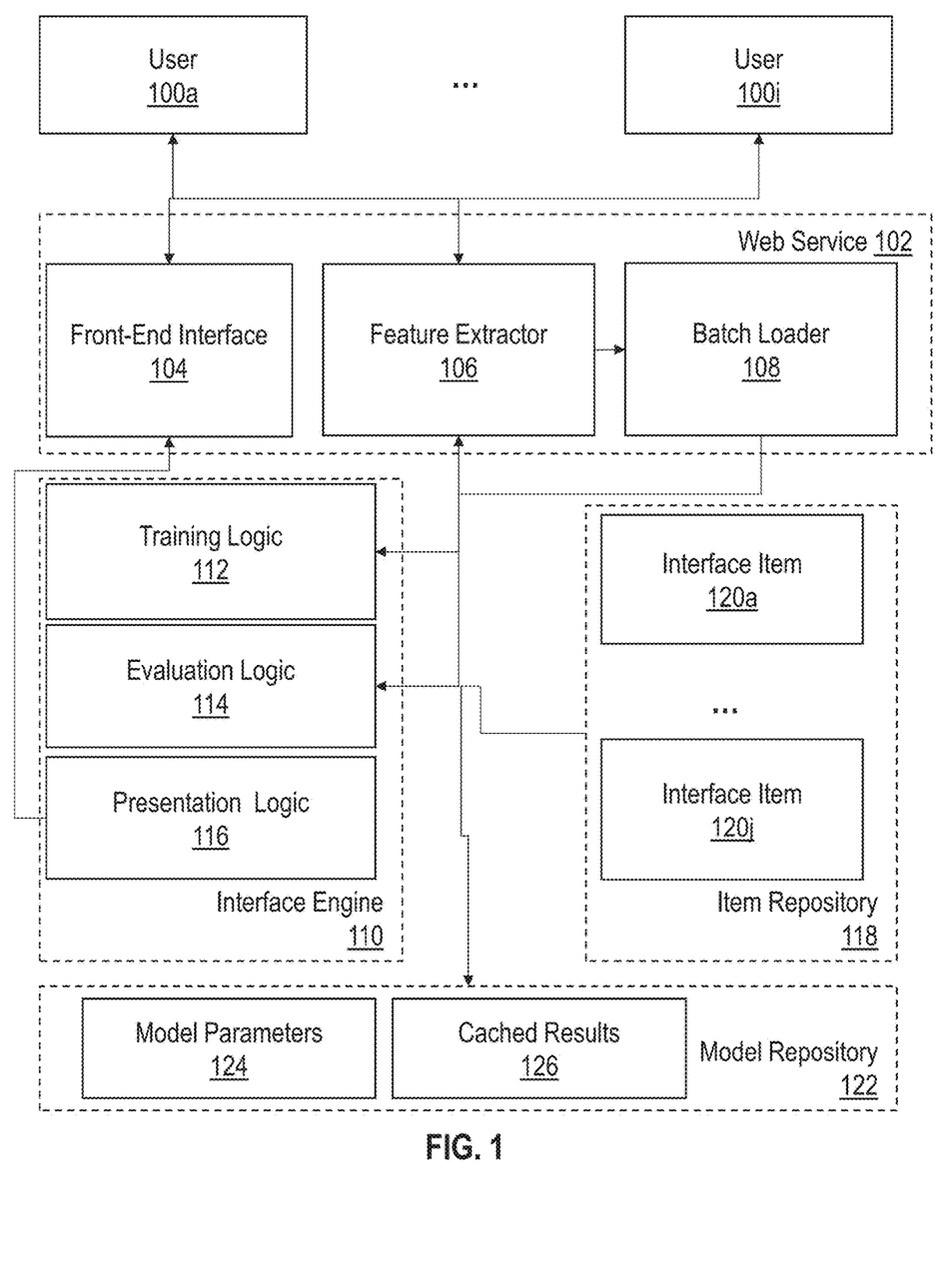
FIG. 1 illustrates an example system including an interface engine for optimizing system behavior based on machine-learning models, in accordance with one or more embodiments.

FIG. 1 illustrates an example including an interface engine for optimizing system behavior based on machine-learning models, in accordance with one or more embodiments. The system generally comprises web service 102, interface engine 110, item repository 118, and model repository 122. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

Web service 102 is a service provided over one or more data communication networks, such as the Internet, to users 100*a-i*. Web service 102 may correspond to a website, a software-as-a-service (SaaS) application, and/or any other resource that may be provided to users 100*a-i* through a network. Web service 102 may be accessed by user 100*a-i* on a subscription or non-subscription (on-demand) basis. For subscription services, users 100*a-i* may correspond to a user account, which may be accessible by one or more human users. Additionally or alternatively, a user may correspond to an application such as a browser or desktop client, or a human user accessing the web service 102 using a host device. A host device in this context may be any computing device that may access web service 102 using communication protocols of the Internet Protocol (Suite), such as the Hypertext Transfer Protocol (HTTP).

Web service 102 generally comprises front-end interface 104 feature extractor 106, and batch loader 108. Components of web service 102 may execute on one or more servers, such as a web server and/or an application server.

Although feature extractor 106 and batch loader 108 are depicted as components of web service 102, in alternative arrangement, these components may be pushed to interface engine 110. In other cases, components of interface engine 110 may be integrated directly into web service 102.

Front-end interface 104 comprises an interface through which users 100a-i interact with web service 102. For example, front-end interface 104 may receive HTTP requests and, in response, present or otherwise provide access to webpages and/or other resources. Front-end interface 104 may include, but is not limited to, a graphical user interface (GUI), an application programming interface (API), and/or a command-line interface (CLI).

Feature extractor 106 captures user features associated with users 100a-i. A user feature in this context may comprise any attribute that describes or otherwise defines a user and a user context. For example, user attributes may include, but are not limited to, a user identifier (ID), a user's age, a user's occupation, a user's gender, a user's clickstream history, and a current web resource the user is accessing. Use attributes may be captured from various sources, including, but not limited to clickstream data, HTTP cookies, logged interactions on the client and/or server side, and user registration data.

Feature extractor 106 may further perform feature selection by filtering user attributes that are not used to formulate predictions. Feature selection reduces the number of dimensions in a feature set, which may allow for faster training and evaluation times. The features that are selected may vary depending on the particular application.

Batch loader 108 is configured to upload newly extracted features in batches. For example, batch loader 108 may buffer features captured while users 100a-i are browsing a website or navigating an SaaS application. Batch loader 108 may periodically load this data into interface engine 110 to update the model parameters.

Item repository 118 and model repository 122 are any type of storage unit and/or device (e.g., a file system, database, collection of tables, or any other storage mechanism) for storing data. Further, image repository 118 and/or model repository 122 may include multiple different storage units and/or devices. The multiple different storage units and/or devices may or may not be of the same type or located at the same physical site. Further, item repository 118 and/or model repository 122 may be implemented or may execute on the same computing system other system components. Alternatively or additionally, item repository 118 and/or model repository 122 may be implemented or executed on a computing system separate from the other system components. Item repository 118 and/or model repository 122 may be communicatively coupled to other system components, including interface engine 110, via a direct connection or via a network.

Item repository 118 stores interface item 120a-j, which may be presented to users 100a-i through front-end interface 104. In one or more embodiments, an interface item is associated with a uniform resource locater (URL). The URL may be embedded in a GUI object, such as a web banner or display icon. When an interface item is presented to a user, the user may click on or otherwise select the GUI object to activate the URL to trigger retrieval of a web resource. For example, selecting the GUI object may direct the user to a new webpage, initiate an application install process, trigger a report download, and/or initiate a database transaction.

Interface engine 110 generally comprises training logic 112, evaluation logic 114, and presentation logic 116. Training logic 112 is configured to generate and store model parameters 124 in model repository 122. Model parameters 124 may capture both linear and nonlinear relationships. In the former, the model parameter may be a weight that represents the relationship strength of a feature (or set of features) in predicting the likelihood that a user will perform a target action with respect to an item. In the nonlinear case, model parameters may represent the interaction between different features. In other words, nonlinear parameters model the effect one feature has on another feature in predicting a given action (e.g., the selection of an interface item).

Evaluation logic 114 loads the most current model parameters 124 from model repository 122 to determine the probability of a given event based on the current context of a target user. Evaluation logic 114 may score each of interface items 120a-j or some subset thereof, where a score represents the probability that the target user will select a corresponding interface item. The techniques described further herein allow for large number of items to be scored in sub-seconds time, allowing the items to be selected and presented in real-time (or quasi-real-time) as the user is accessing web service 102.

Presentation logic 116 selects a subset of interface items 120a-j to present to the target user via front-end interface 104. For example, presentation logic 116 may select the top-n highest scored interface items corresponding to the most likely interface items for which the target user is likely to select or otherwise perform a target action. Presentation logic 116 may add these interface items to a web page or other interface that is currently being accessed by the target user.

3. Proximal Factorization Machine Models

3.1 Modelling and Optimization Overview

Determining which interface items a user is most likely to click on or otherwise select may be formulated as a binary classification problem. A binary classification problem is a type of logistic regression problem in which the value of a target action, also referred to herein as a label denoted y, can take on one of two values, represented by a 0 and a 1. For example, a "1" may indicated that a target action is performed, and a "0" may indicate that the target action is not performed.

Mathematically, a hypothesis function $h_\theta(x)$ for the binary classification problem may be formulated as follows:

$$h_\theta(x) = g(\theta^T x) = \frac{1}{1 + e^{-\theta_x^T}} \qquad (1)$$

where $\theta$ is a model parameter, x is a feature, and $g(\theta^T x)$ is the logistic or sigmoid function. As $\theta^T x$ approaches, the value of $g(\theta^T x)$ approaches one. As $\theta^T x$ approaches negative infinity, the value of $g(\theta^T x)$ approaches 0. Thus, the value of $h_\theta(x)$ and $g(\theta^T x)$ are bounded between 0 and 1.

The probability that a given event y will be occur (i.e., y=1) or not occur (i.e., y=0) may be mathematically represented as follows:

$$P(y=1|x;\theta) = h_\theta(x) \qquad (2)$$

$$P(y=0|x;\theta) = 1 - h_\theta(x) \qquad (3)$$

Equations (2) and (3) may be rewritten as follows:

$$P(y|x;\theta) = (h_\theta(x))^y (1 - h_\theta(x))^{1-y} \qquad (4)$$

In order to compute the model parameters embodied by θ, one approach is to maximize the likelihood of obtaining observed data for the given choice of θ. If there are m independently generated training examples in the observed data, the likelihood of the model parameters in obtaining the observed data may be represented as:

$$L(\theta) = p(\vec{y}|X;\theta) = \Pi_{i=1}^{m} p(y^{(i)}|x^{(i)};\theta) = \Pi_{i=1}^{m}(h_\theta(x^{(i)})^{y^{(i)}}(1-h_\theta(x^{(i)}))^{1-y^{(i)}} \quad (5)$$

Instead of maximizing L(θ), another technique is to maximize any strictly increasing function of L(θ). This approach may be represented by the following log-likelihood function:

$$l(\theta) = \log(L(\theta)) = \sum_{i=1}^{m} y^{(i)} \log(h_\theta(x^{(i)})) + (1 - y^{(i)})\log(1 - h_\theta(x^{(i)})) \quad (6)$$

Given $$\underset{x}{\mathrm{argmax}}(x) = \underset{x}{\mathrm{argmin}}(-x) \quad (7)$$

then the following are equivalent:

$$\underset{\theta}{\mathrm{argmax}}(x) \sum_{i=1}^{m} y^{(i)} \log(h_\theta(x^{(i)})) + (1 - y^{(i)})\log(1 - h_\theta(x^{(i)})) = \quad (8)$$

$$\underset{\theta}{\mathrm{argmin}}(x) \sum_{i=1}^{m} -y^{(i)} \log(h_\theta(x^{(i)})) - (1 - y^{(i)})\log(1 - h_\theta(x^{(i)}))$$

In order to fit θ to for a logistic regression model, the negative log-likelihood may be minimized, which is equivalent to minimizing the cost function as follows:

$$J(\theta) = \frac{-1}{m} \sum_{i=1}^{m} (y^{(i)} \log(h_\theta(x^{(i)})) + (1 - y^{(i)})\log(1 - h_\theta(x^{(i)}))) \quad (9)$$

The logistic regression model represented by equation (9) allows for efficient training in online applications with large features sets. In these applications, a feature set may have millions or even billions of dimensions. However, each separate instance of the feature set may have relatively few (e.g., hundreds) of non-zero values due to the sparse nature of the data. For example, in a movie recommendation system, a feature set may comprise millions of separate movie titles, but a typical user will have only ranked a very small subset of these movies. The remaining movies that have not been rated by the user are assigned a zero value for that instance of the features set. Due to the sparse nature of the data, repeat instances of a features set are unlikely. As a result, the logistic regression models, may be efficiently trained over large data sets since each training example may only be considered once. Other advantages of the linear prediction model also include, but are not limited to: (a) the ability to generate a prediction at any point in time given a sparse set of training data; (b) the ability to adapt to changing user attributes, and (c) the ability to process new data without retraining the entire model.

3.2 Factorization Machines

One disadvantage with logistic regression models is the inability to capture higher-order (i.e., nonlinear) dependencies between features, which may improve prediction accuracy. As previously noted, factorization machines may be used to model such nonlinear feature dependencies (also referred to as feature interactions). Factorization machines are also able to estimate nonlinear feature interactions under high sparsity and have linear complexity, allowing these models to scale well.

A factorization machine that models second-order dependencies (i.e., that has a degree d=2) may be defined as follows:

$$\hat{y} = \theta_0 + \sum_{i=1}^{n} \theta_i x_i + \sum_{i=1}^{n} \sum_{j=i+1}^{n} \langle v_i, v_j \rangle x_i x_j \quad (10)$$

where $V \in \mathbb{R}^{n \times k}$ and $\langle v_i, v_j \rangle$ is the dot product of two factor vectors of size k such that:

$$\langle v_i, v_j \rangle = \sum_{f=1}^{k} v_{i,f} v_{j,f} \quad (11)$$

The model parameters for estimation during model training include $\theta_0 \in \mathbb{R}$: This parameter is a global weight (or bias) for the model;

$\theta_i \in \mathbb{R}^n$: This parameter is a weight that models the linear relationship of the ith feature in feature vector x on the label y; and $V \in \mathbb{R}^{n \times k}$: This parameter is the dot product of two factor vectors as above and models the interaction between the ith and jth variable in a feature vector.

The factorization machine per the model equation (10) above includes both a linear component and a nonlinear component. The linear component is modelled by $\sum_{i=1}^{n} \theta_i x_i$. In other words, this portion of the model represents the linear relationship between the ith feature in feature vector x and the probability of a given event y. The parameter value $\theta_i$ may be larger for features that have a strong relationship and smaller for features that have weak or no relationship.

A two-way factorization machine (degree d=2) captures all single and pairwise interactions between variables. The nonlinear component may be modelled as follows:

$$\sum_{i=1}^{n} \sum_{j=i+1}^{n} \langle v_i, v_j \rangle x_i x_j = \frac{1}{2} \sum_{i=1}^{n} \sum_{j=i+1}^{n} \langle v_i, v_j \rangle x_i x_j - \frac{1}{2} \sum_{i=1}^{n} \langle v_i, v_j \rangle x_i x_i \quad (12)$$

$$= \frac{1}{2} \left( \sum_{i=1}^{n} \sum_{j=1}^{n} \sum_{f=1}^{k} v_{i,f} v_{j,f} x_i x_j - \sum_{i=1}^{n} \sum_{f=1}^{n} v_{i,f} v_{j,f} x_i x_j \right)$$

$$= \frac{1}{2} \sum_{f=1}^{k} \left( \left( \sum_{i=1}^{n} v_{i,f} x_i \right) \left( \sum_{j=1}^{n} v_{j,f} x_j \right) - \sum_{i=1}^{n} v_{i,f}^2 x_i^2 \right)$$

$$= \frac{1}{2}\sum_{f=1}^{k}\left(\left(\sum_{i=1}^{n} v_{i,f} x_i\right)^2 - \sum_{i=1}^{n} v_{i,f}^2 x_i^2\right)$$

The nonlinear component has only linear complexity in both k and n. Thus, the computation may be performed in O(kn). In other cases, the degree may be increased to capture higher-order (e.g., three or more) interactions between features.

With sparse data, there may not be enough historical observations to directly and independently capture interactions between variables. However, the nonlinear component of the factorization machine may still model these interactions between features, even without such observations, through factorization. For example, even though user A has not rated item x, the model parameters for this feature interaction may still be estimated. Factorization may be performed by factorizing the feature interactions of similar and/or dissimilar users to user A. For example, user A may have rated item Y very highly. Other users that have rated item Y highly may have also rated item X highly. On the other hand, users that have rated item Y poorly may have also rated item X poorly. In this case, the dot product of the factor vectors for user A and item X will be similar to the one for user A and item Y.

3.3 Factorization Training

Figure 2:
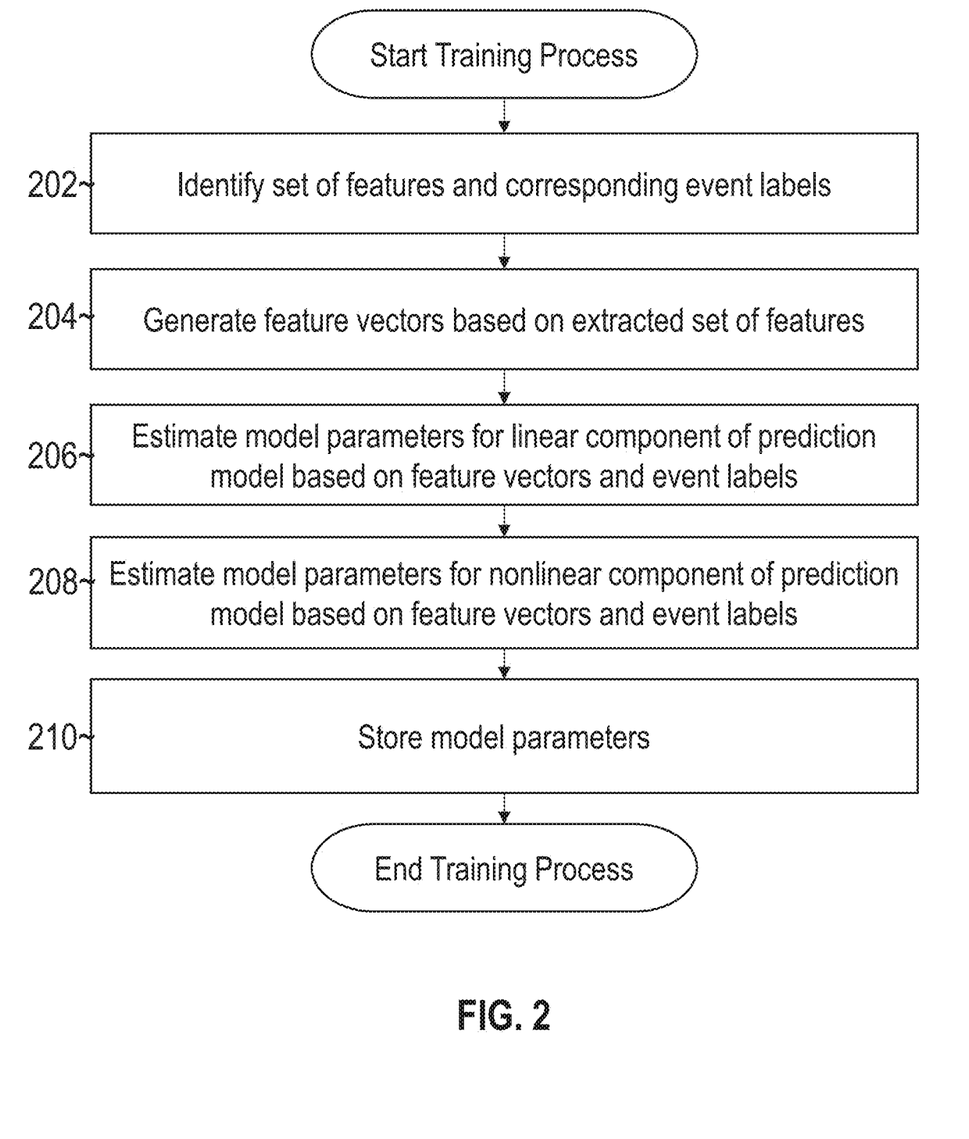
FIG. 2 illustrates an example set of operations for training a predictive model, in accordance with one or more embodiments.

In one or more embodiments, the model parameters for the factorization are estimated during a training phase. FIG. 2 illustrates example set of operations for training a predictive model, in accordance with one or more embodiments. The set of operations includes identifying a set of user features and corresponding event labels. (Operation 202). Features may be extracted from a variety of sources. For example, user features may be extracted from user metadata, clickstream data, HTTP cookies, user registration information third-party sources, and/or marketing cloud services. Item features may be extracted from item metadata, external sources, third-party sources and/or item registration information, among other sources. Feature selection may be implemented to filter out features that are used to train and evaluate the model. The corresponding event labels may capture target actions taken by users 100a-i with respect to interface items 120a-j. For example, an event label of "1" may be assigned if a user rated an item above a threshold value and "0" if the user rated an item below the threshold. As another example, an event label of "1" may be assigned if a user clicked on and/or downloaded an item and "0" if the user did not click on and/or download the item. Other actions and observations may also be captured by the training set of data, depending on the particular implementation.

The set of operations further comprises generating feature vectors based on the set of extracted features (Operation 204). In one or more embodiments, the feature vectors are formed by mapping the extracted features to indices in a hash space. For example, a hash function may be applied to each nonzero (or nonempty) key-value pair to map to a particular element in the feature vector. The element may then be set to "1". This technique, which is sometimes referred to as the "hashing trick", allows large feature space can be projected onto a much smaller space (e.g., $2^{22}$ features). As a result, the instances of large features sets (e.g., billions of dimensions) may be encoded in features vectors that are small enough to fit within main memory on a single machine where the raw feature data would not. Additionally, the hash trick allows for quick access into parallel arrays that hold information on the model being fitted. An example hash function that may be applied at this operation is one-hot encoding. However, other hash functions may also be employed, depending on the particular implementation.

Once the feature vectors and the corresponding event labels have been obtained, training logic 112 estimates feature weights for the linear component of the prediction model (Operation 206). In the context of a factorization machine, for example, the weight vector, $\vec{\theta}$, may be generated where $\theta_i$ in the vector represents the linear relationship between the ith feature and the event label. The parameter weights may be selected to minimize a cost (or logistic loss) function previously identified.

Training logic 112 further estimates model parameters for a nonlinear component of prediction model based on feature vectors and event labels (Operation 208). For a factorization machine, this operation involves computing generating estimates for $V \in \mathbb{R}^{n \times k}$. Techniques for estimating model parameters for Operation 206 and Operation 208 are described in further detail below.

Training logic 112 next stores the estimated model parameters in model repository 122 (Operation 210). These model parameters may be loaded during the evaluation phase as described in the section below.

3.4 Parameter Estimation and Learning

The factorization machine parameters may be estimated and learned through a variety of approaches. As noted above, optimization occurs by minimizing a cost (or log-loss) function. The process of minimizing the loss may include computing a set of gradients. In the case of a factorization machine, the gradients may be represented as follows:

$$\frac{\partial}{\partial \theta}\hat{y}(x) = \begin{cases} 1 & \text{if } \theta \text{ is } \theta_0 \\ x_i & \text{if } \theta \text{ is } \theta_i \\ x_i \sum_{j=1}^{n} v_{j,f} x_j - v_{i,f} x_i^2 & \text{if } \theta \text{ is } v_{i,f} \end{cases} \quad (13)$$

One approach for minimizing the loss function is via online gradient descent. This process may be implemented as follows. Given a set of gradients:

$$\vec{g}_t = \left(\frac{\partial}{\partial \theta} J(\vec{\theta})\right)_t = \left(y_t - h_{\vec{\theta}_t}(\vec{x}_t)\right)\vec{x}_t, \quad (14)$$

where t is the current observation number, $\vec{x}_t$ is the received feature vector of n features, $y_t$ is the observed label $\in \{0,1\}$, perform the update:

$$\text{Repeat}\{\vec{\theta}_{t+i} = \vec{\theta}_t - \alpha_t \vec{g}_t\} \quad (15)$$

where $\alpha_t$ is a non-increasing learning rate schedule, such as $1/\sqrt{t}$.

The online gradient descent method is accurate at estimating parameter values for the linear and nonlinear components of the factorization machine. However, the resulting prediction models are relatively dense, which makes the models expensive to store.

Another technique to estimate parameters in a factorization machine is to use the FTRL-Proximal algorithm, which provides sparser models and more effective runtime performance than online gradient descent. The FTRL-proximal algorithm uses the update $$\vec{\theta}_{t+1} = \underset{\theta}{\operatorname{argmin}}\left(\sum_{s=1}^{t}\vec{g}_s \cdot \vec{\theta} + \frac{1}{2}\sum_{s=1}^{t}\left(\frac{1}{\alpha_s} - \frac{1}{\alpha_{s-1}}\right) \cdot \|\vec{\theta} - \vec{\theta}_s\|_2^2 + \lambda_1\|\vec{\theta}\|_1\right) \quad (16)$$

The following definitions apply to the FTRL-proximal algorithm:

$$\sigma_s = \left(\frac{1}{\alpha_s} - \frac{1}{\alpha_{s-1}}\right) \quad (17)$$

where $$\sum_{s=1}^{t}\sigma_t = \frac{1}{\alpha_t} \quad (18)$$

The FTRL-proximal algorithm may then be expressed as follows:

$$\left(\sum_{s=1}^{t}\vec{g}_s - \sum_{s=1}^{t}\sigma_s\vec{\theta}_s\right) \cdot \vec{\theta} + \frac{1}{\alpha_t}\|\vec{\theta}\|_2^2 + \lambda_1\|\vec{\theta}\|_1 + (const) \quad (19)$$

Thus, if the following is stored $$\vec{z}_{t-1} = \left(\sum_{s=1}^{t}\vec{g}_s - \sum_{s=1}^{t}\sigma_s\vec{\theta}_s\right) \quad (20)$$

at the beginning of observation t, the update may be performed by letting $$\vec{z}_t = \vec{z}_{t-1} + \vec{g}_t - \sigma_t\vec{\theta}_t \quad (21)$$

And solve for $\vec{\theta}_t$ on a per-coordinate basis by $$\theta_{t+1}[i] = \begin{cases} 0 & \text{if } |z_t[i]| \le \lambda_1 \\ -\alpha_t(z_t[i] - \text{sgn}(z_t[i])\lambda_1) & \text{otherwise} \end{cases} \quad (22)$$

Thus, the FTRL-Proximal stores the real vector $\vec{z}$ in memory, where the online gradient descent method stores model parameters $\vec{\theta}$.

As indicated above, FTRL-Proximal allows per-coordinate learning rates. In other words, the model parameters (or weight) for one explanatory variable (or feature) may be adjusted at a different rate than the model parameter for another explanatory variable. For example if $g_s[i]$ is the ith coordinate of the gradient $$\vec{g}_s = \left(\frac{\partial}{\partial \theta}J(\vec{\theta})\right)_s,$$

the per coordinate rate may be computed as follows:

$$a_t[i] = \frac{\alpha_{param}}{\beta_{param} + \sqrt{\sum_{s=1}^{t}g_s[i]^2}} \quad (23)$$

where $\alpha_{param}$ and $\beta_{param}$ are tuning variables. The values of the tuning variables may vary depending on the particular implementation. In general, $\beta_{param}=1$ has been found to yield good performance, with the value of $\alpha_{param}$ variable depending on the features of the dataset.

If per-coordinate learning rates are integrated into the model with an L2 regularization term of strength $\lambda_2$, the update model in Eq. (22) becomes:

$$\theta_{t+1}[i] = \quad (24)$$

$$\begin{cases} 0 & \text{if } |z_t[i]| \le \lambda_1 \\ -\left(\frac{\beta_{param} + \sqrt{\sum_{s=1}^{t}g_s[i]^2}}{\alpha_{param}}\right)(z_t[i] - \text{sgn}(z_t[i])\lambda_1) & \text{otherwise} \end{cases}$$

The per-coordinate learning rates may be applied to both the linear and nonlinear parameters of the factorization machine.

3.5 Batch Updates

In one or more embodiments, the prediction model above is trained by fitting the model parameters continuously or periodically offline in small batch sets. The model parameters, in this way, may be continuously learned offline and persisted. For a given consumer entering a website or other service, items may be evaluated and scored in real-time, using the most recently available parameters. With the training process occurring offline, the response times for item scoring and presentation may be optimized.

Figure 3:
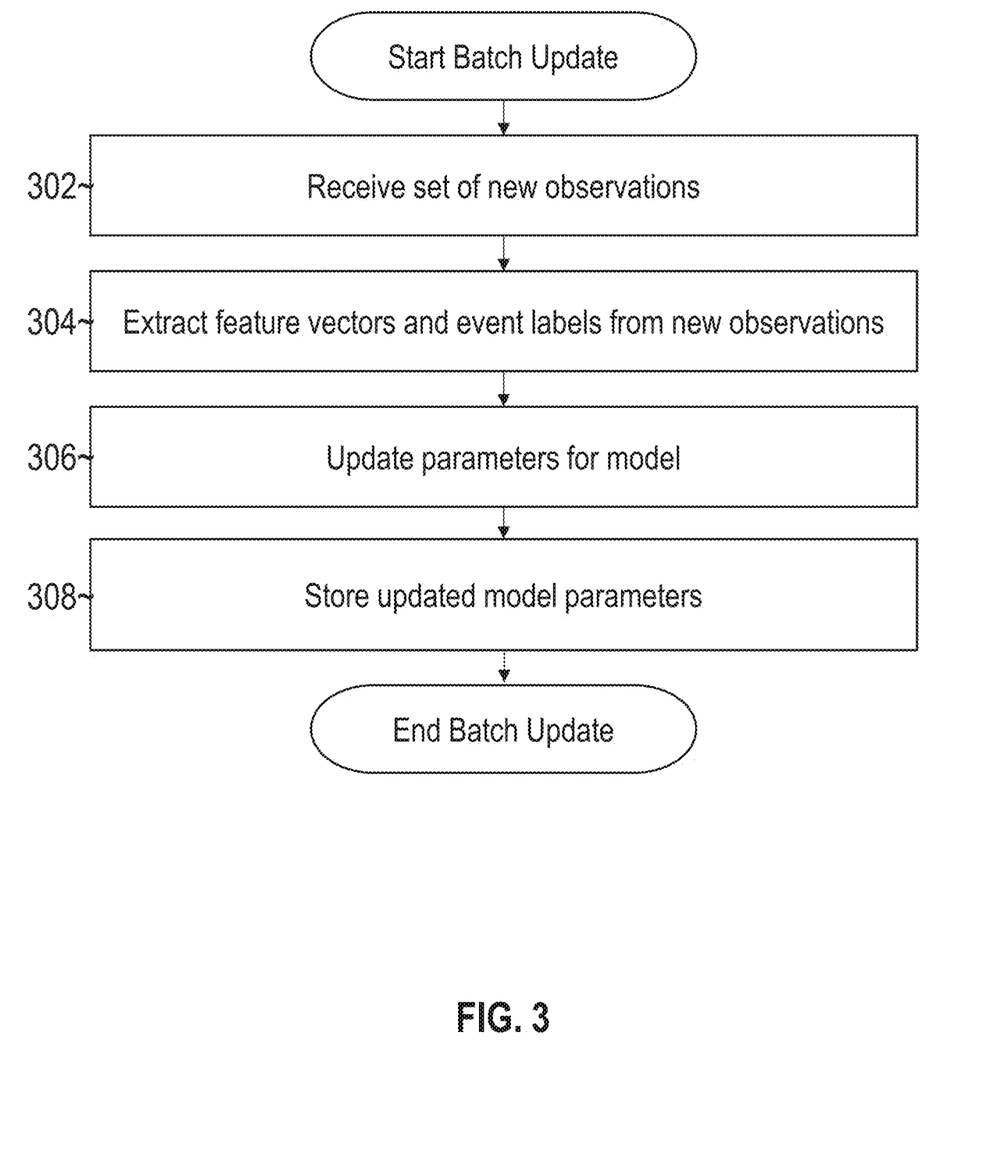
FIG. 3 illustrates an example set of operations for performing batch updates of model parameters, in accordance with one or more embodiments.

FIG. 3 illustrates an example set of operations for performing batch updates of model parameters, in accordance with one or more embodiments. The set of operations includes receiving a new set of observations (Operation 302).

Responsive to receiving the new observations, feature extractor 106 generates feature vectors and corresponding event labels from the new observations (Operation 304). The feature vectors may be formed by mapping the features to a hash space, as previously described. As new observations are received, the feature vectors and corresponding labels may be buffered in small sets by batch loader 108. Once the buffer is full, the observations may be provided to training logic 112.

Based on the new set of feature vectors and corresponding event labels, training logic 112 updates the parameters for the prediction model (Operation 306). In one or more embodiments, training logic 112 implements the FTRL proximal algorithm to estimate the updated parameter values, as described in the previous section. Also, as previously indicated, the learning rate may vary between different model parameters during this operation.

Training logic 112 next stores the updated model parameters in model repository 124 (Operation 308). Once persisted, the updated model parameters may be loaded by evaluation logic 114 to score and present interface items to users 100a-i.

4. Predictive Scoring and Item Presentations

When a user (referred to herein as a "target user") is accessing web-service 102, interface engine 110 scores and presents subsets of interface items 120a-j based on the user context and the trained prediction model. For example, interface engine 110 may select and present, through front-end interface 104, the top-n interface items with which the target user is most likely to interact.

Figure 4:
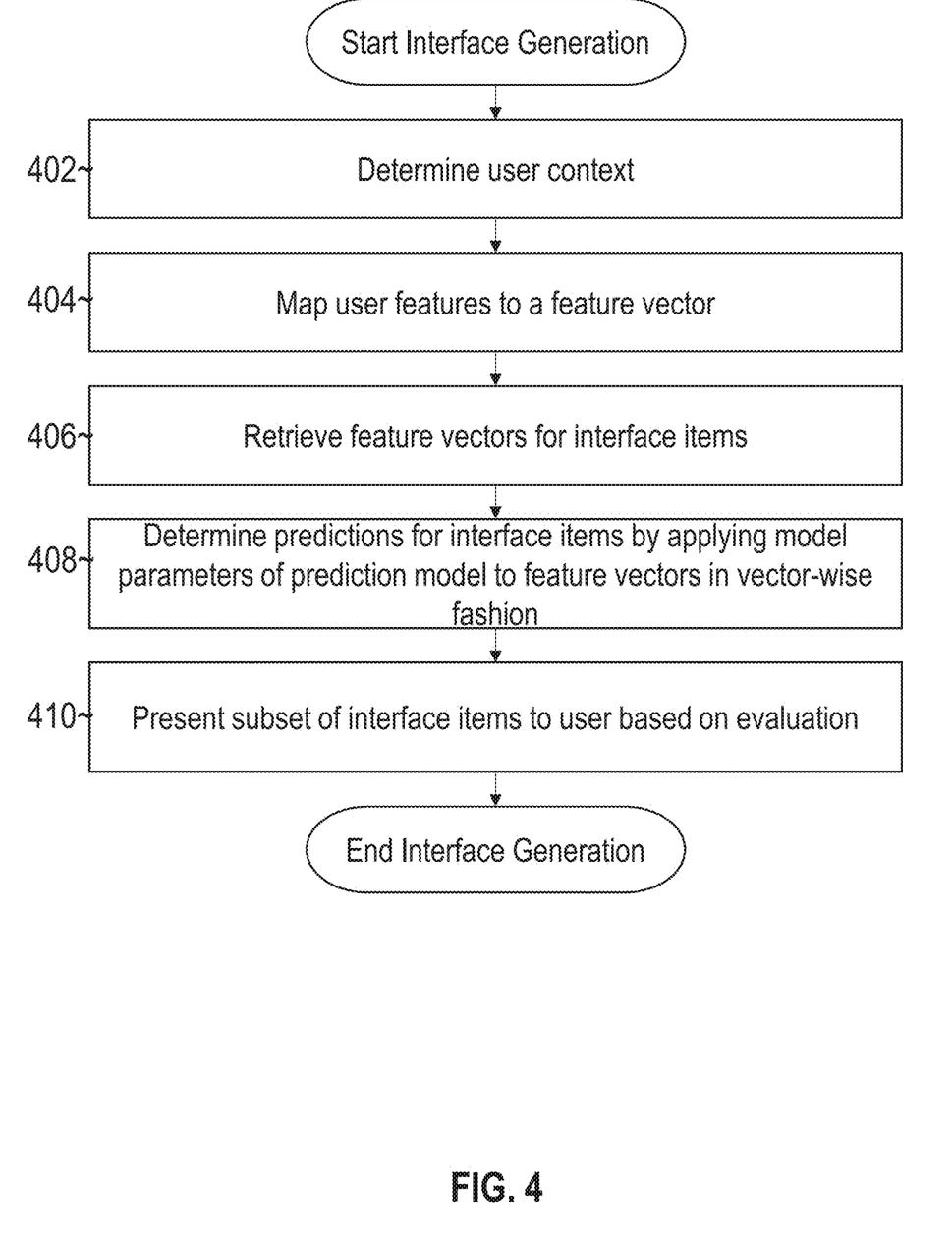
FIG. 4 illustrates an example set of operations for computing predictive scores, as a function of feature vectors and model parameters, to select and present interface items, in accordance with one or more embodiments.

FIG. 4 illustrates an example set of operations for computing predictive scores, as a function of feature vectors and model parameters, to select and present interface items, in accordance with one or more embodiments. The set of operations includes determining a user context for a target user (Operation 402). Feature extractor 106 may determine user context from any of the sources previously described. For example, feature extractor 106 may determine, from clickstream data, a webpage (or other resource) that the user is currently accessing. Feature extractor 106 may further identify ratings or other interactions that the target user has had with interface items 120a-j from historical data maintained for the target user. Other user features, such as a user ID, occupation, age, etc., may also be extracted. The set of features extracted may vary depending on the implementation and the amount of data collected for the target user.

Figure 5:
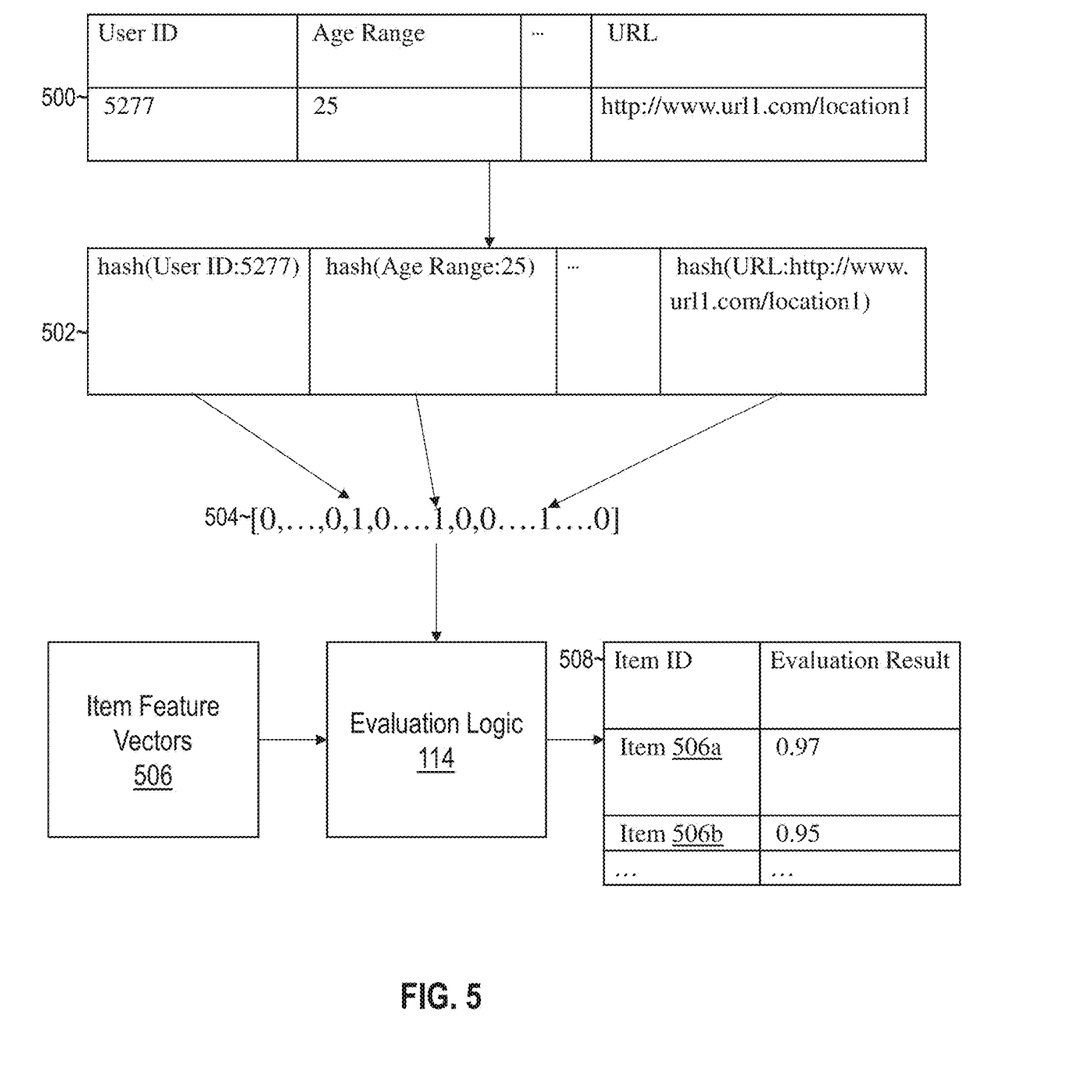
FIG. 5 illustrates an example set of interface items for which predictive scores are computed as a function of feature vectors and model parameters, in accordance with one or more embodiment.

FIG. 5 illustrates an example set of interface items for which predictive scores are computed as a function of feature vectors and model parameters, in accordance with one or more embodiment. As illustrated, table 500 stores a plurality of key-value pairs for various user attributes, which may be extracted and maintained for a target user. The use attributes/features include a user ID, an age range, and a URL that is currently being accessed by the target user.

Referring again to FIG. 4, feature extractor 106 maps the user features extracted for the target user to a feature vector (Operation 404). In one or more embodiments, feature extractor 106 uses the hashing trick previously described to map the user features to indices in a hash space. Referring to FIG. 5, for example, a hash function may be applied to the key-value pairs as depicted in table 502. An example hash function that may be applied is one-hot encoding, although other hash functions may be used, depending on the particular implementation. The hash function maps the extracted features to different indices in feature vector 504 of size n, where n corresponds to the size of the hash space. The value at the corresponding index/vector position is set to "1" for each feature. The remaining indices have a value of "0", meaning that these features were not detected for the target user.

Referring to FIG. 4, feature extractor 106 retrieves feature vectors for interface items 120a-j (Operation 406). These feature vectors may be precomputed and stored as the interface items are added to item repository 118. The feature vectors may encode various key-value attributes of the interface items, similar to the user feature vector encodings for the user-attribute pairings. Example interface attributes may include, but are not limited to, item IDs, average item ratings, click-through statistics, category information, and item compatibility information.

Evaluation logic 114 next determines predictions/scores for each interface items by applying the model parameters of the prediction model to the user and item feature vectors in a vector-wise fashion (Operation 408). In one or more embodiments, the model parameters for both the linear and nonlinear components of a factorization machine, per the model depicted in Eq. (10) are applied. For the linear component, a weight may be applied to each feature in a feature vector based on the relative relationship strength between the feature in contributing to a predicted event outcome (e.g., selecting an interface item or rating the interface item highly). The nonlinear components may apply weights based on the interaction of the feature with other features in the features vectors. As previously indicated, the weights in the nonlinear components may be determined based on the similarity of the interaction with other feature interactions. For example, the weight assigned to the interaction of User Feature A and Product Feature B may be based, in part, on the interaction between User Feature C and Product Feature D as captured by the factorization machine.

Referring to FIG. 5, evaluation logic 114 receives user feature vector 504 and item feature vectors 506. Evaluation logic 114 loads the most recent model parameters from model repository 122 and applies the parameters to the input feature vectors to generate predictions for each of interface items 120a-j. Table 508 is a result of the evaluation, which sorts interface items based on probability scores. The higher the probability that a user will perform a target action with respect to the interface item, the higher the score.

One approach to evaluating the interface items is to build a full matrix of user and item features. For example, the matrix may be computed by performing a union of the user feature vector with each item feature vector. However, by splitting the feature vectors, significant runtime performance gains may be realized. As an example, a prediction may be generated for a set of m products and a set of n features that describe the target user. To simplify the explanation, it is assumed that the product features consist of one feature per product, such as a product ID. However, other implementations may be evaluated against several product features. In the case where there is one product feature, the complexity of computing the probability of the current consumer clicking on each of the m products using the full matrix would be $O(mk(n+1))=O(mkn+mk)$, where k is the size of the vectors used to compute $V \in \mathbb{R}^{n \times k}$ corresponding to the number of latent factors.

Another approach to generating prediction is to split the input feature vector x of the factorization machine into two or more vectors. For example, rather than computing the full user matrix, two (or more) input vectors may be provided to evaluation logic 114. One feature vector may encode non-item specific (or user-specific) features and another feature vector may encode item-specific vectors. With this approach, the model parameters/weights may be applied to the user/non-item specific features once. The results may then be cached in a result vector. The model parameters/weights may then be applied to the item-specific features and stored in a set of one or more result vectors. The user-result vector may then be combined with the item result vectors by computing the inner dot product to generate a final prediction/score for each item. By splitting the input feature vector x into non-item (e.g., user-specific) and item-specific features, the complexity is reduced to $O(kn+mk)$.

Once the predictions have been generated, presentation logic 116 selects and presents a subset of the interface items to a user through front-end interface 104 (Operation 410). For example, presentation logic 116 may select the top-n interface items to present, where n is a positive integer which may vary depending on the particular application. If the user selects or otherwise interacts with an interface item, the action may be captured and used to update the prediction model as previously described.

Figure 6:
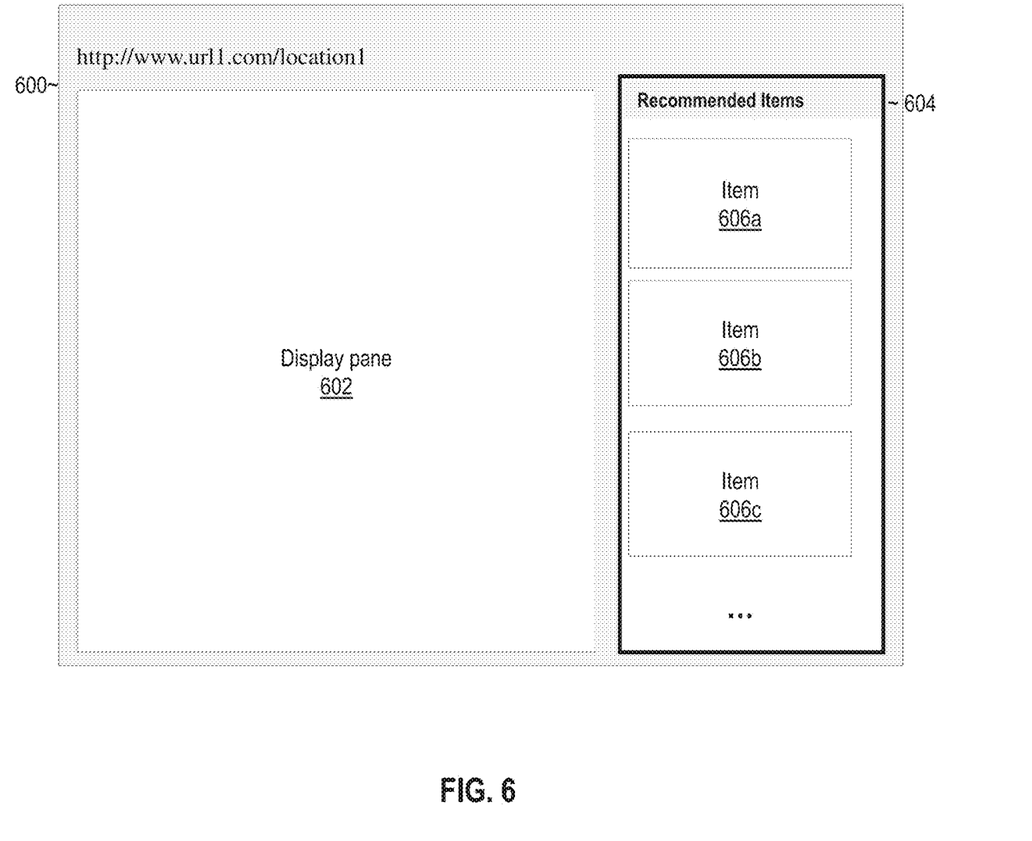
FIG. 6 illustrates an example interface that may be generated and presented by a proximal factorization machine interface engine, in accordance with one or more embodiment.

FIG. 6 illustrates an example interface that may be generated and presented by a proximal factorization machine interface engine, in accordance with one or more embodiment. As a user is browsing a website, the user may navigate to web page 600, which presents content through display pane 602. Evaluation logic 114 may evaluate a plurality of interface items in item repository 118 in realtime as the user is accessing web page 600. Evaluation logic 114 may identify the items that the user is most likely to perform a target action (e.g., select, purchase, rate highly, install, download, etc.) on and present these items through display pane 604. Items 606a-c may include embedded hyperlinks, URLs, and/or code that allow the user to complete the target action when selected. The example interface presented in FIG. 6 is provided for purposes of illustration. The arrangement and presentation of the interface items may vary from implementation to implementation.

The prediction model described above may combine content and collaborative-based filtering into a single, recommender system. In the context of content-based filtering, for example, the linear component may be trained to estimate model parameters for different item features. During evaluation, the model parameters may be used to identify items similar to one that a user is currently viewing. In other words, items that do not have similar features to the one that a user is currently viewing may be filtered out. For collaborative filtering, the nonlinear parameters may be trained to model relationships between different features. The weights are determined, based in part, on the similarity of user behavior extrapolated from the training set of data. Thus, the items to present to a target user may be selected, based in part, on the similarity of the target user, in terms of behavior and/or other attributes, to other system users.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
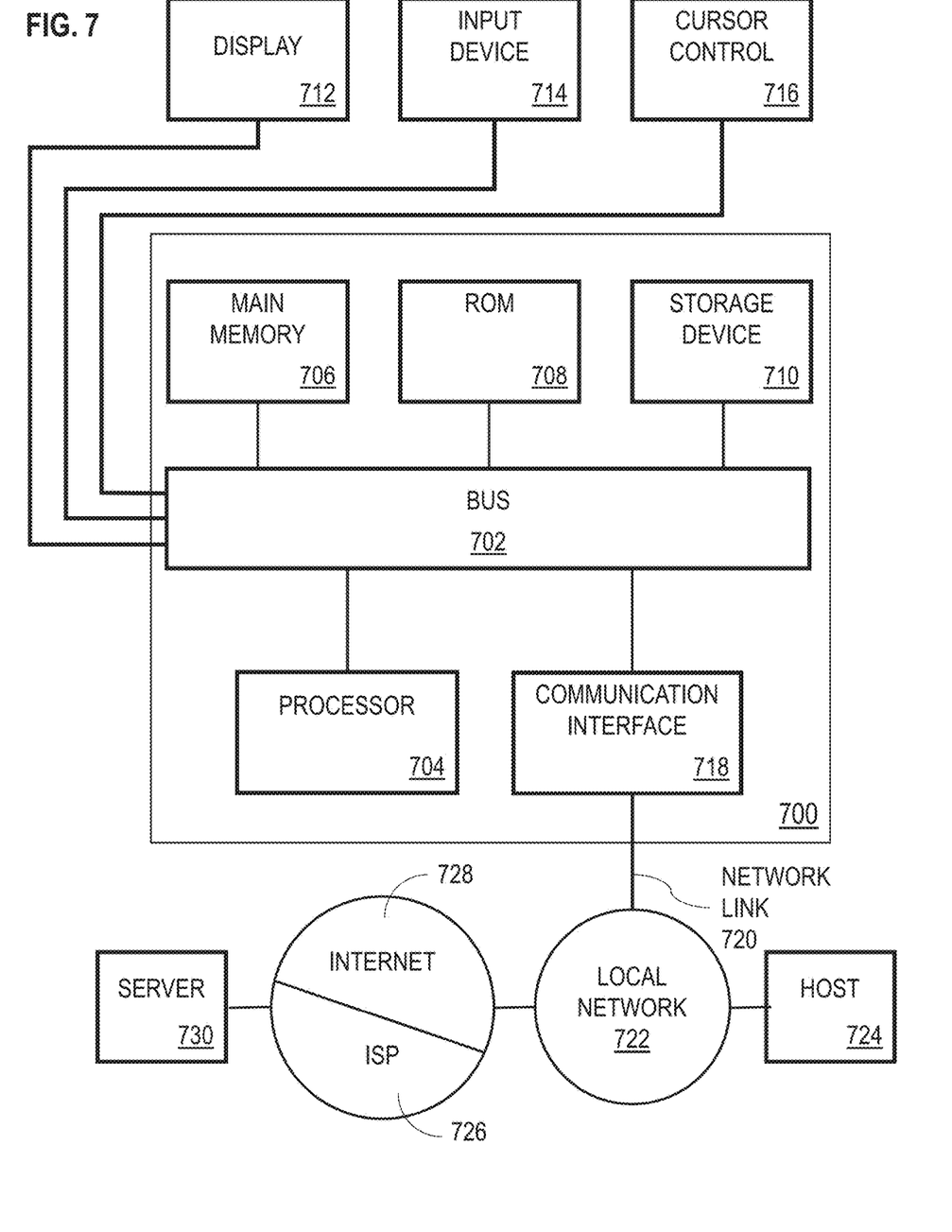
FIG. 7 illustrates an example system upon which one or more embodiments may be implemented.

For example, FIG. 7 is a block diagram that illustrates computer system 700 upon which one or more embodiments may be implemented. Computer system 700 includes bus 702 or other communication mechanism for communicating information, and hardware processor 704 coupled with bus 702 for processing information. Hardware processor 704 may be, for example, a general purpose microprocessor.

Computer system 700 also includes main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes read only memory (ROM) 708 or other static storage device coupled to bus 702 for storing static information and instructions for processor 704. Storage device 710, such as a magnetic disk or optical disk, is provided and coupled to bus 702 for storing information and instructions.

Computer system 700 may be coupled via bus 702 to display 712, such as a cathode ray tube (CRT), liquid crystal display (LCD), or light-emitting diode (LED), for displaying information to a computer user. Input device 714, which may include physical and/or touchscreen based alphanumeric keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to host computer 724 or to data equipment operated by Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, server 730 might transmit a requested code for an application program through Internet 728, ISP 726, local network 722 and communication interface 718.

The received code may be executed by processor 704 as it is received, and/or stored in storage device 710, or other non-volatile storage for later execution.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable storage media storing instructions which, when executed by one or more hardware processors, causes performance of a set of operations comprising:
   receiving training data that identifies a set of actions taken by a plurality of users with respect to a plurality of items;
   responsive to receiving the training data, training a prediction model, wherein training the prediction model includes generating, for the prediction model, (a) a linear prediction component of a factorization machine modelling linear relationships, learned from the training data, between features of the plurality of users and the set of actions, and (b) a nonlinear prediction component of the factorization machine modelling nonlinear interactions, learned from the training data, between different features in predicting the set of actions, wherein different learning rates are applied to different model parameters of the linear component of the factorization machine and the nonlinear component of the factorization machine during training;
   generating a first feature vector based on a first set of features associated with a user that is currently accessing a particular web service;
   for each respective item in a plurality of items:
      generating a respective feature vector for the respective item based on a respective set of features associated with the respective item;
      determining a respective probabilistic score of the user performing a target action;
   wherein the respective probabilistic score for a respective item is computed as a function of (a) the linear prediction component, (b) the nonlinear prediction component, (c) the first feature vector, and (d) the respective feature vector for the respective item;
   identifying, based on the probabilistic score for each respective item, a subset of items from the plurality of items to present to the user; and
   presenting the subset of items from the plurality of items to the user through an interface of the particular web service.

2. The non-transitory computer-readable storage media of claim 1, wherein the linear model component applies a set of weights based on relationships strengths between the features in contributing to a predicted event outcome.

3. The non-transitory computer-readable storage media of claim 1, wherein the different model parameters include weights for pairwise interactions between features from a feature set including features from the plurality of users and the plurality of items; wherein a weight for a particular interaction between two features in the feature set is computed, at least in part, as a factor of pairwise interactions between other features in the feature set.

4. The non-transitory computer-readable storage media of claim 1, wherein determining the respective probabilistic score comprises generating a first result vector by applying the linear prediction component and the nonlinear prediction component to the first feature vector; caching the first result vector; generating at least a second result vector by applying the linear prediction component and the nonlinear prediction component to the respective feature vector for each respective item; and combining the cached first result vector with at least the second result vector to compute the respective probabilistic score.

5. The non-transitory computer-readable storage media of claim 1, wherein the respective probabilistic score is computed without building a full matrix of user and product features.

6. The non-transitory computer-readable storage media of claim 1, wherein the first set of features associated with the user include at least one feature extracted from clickstream data captured from the user.

7. The non-transitory computer-readable storage media of claim 1, wherein the different model parameters are generated based at least in part on a function that minimizes a log-loss between different observations in the training data.

8. The non-transitory computer-readable storage media of claim 1, wherein the function is a Follow-the-Regularized-Leader (FTRL) function.

9. The non-transitory computer-readable storage media of claim 1, the operations further comprising updating the linear prediction component and the nonlinear prediction component based on additional actions between the plurality of users and the plurality of items; wherein the additional actions are received subsequent to receiving the training data.

10. The non-transitory computer-readable storage media of claim 1 wherein the factorization machine is approximated by a function as follows:

$$\hat{y} = \theta_0 + \sum_{i=1}^{n} \theta_i x_i + \sum_{i=1}^{n} \sum_{j=i+1}^{n} \langle v_i, v_j \rangle x_i x_j$$

where $\hat{y}$ is a predicted action, $\theta_0$ is a global model parameter, $x_i$ is an ith feature in feature vector x including n number of features, $\theta_i$ is a first model parameter in a first set of model parameters applied to $x_i$, $\langle v_i, v_j \rangle$ is a second model parameter in a second set of model parameters computed from a dot product between factorization vectors $v_i$ and $v_j$ and applied to a pairwise interaction between the ith feature and a jth feature in feature vector x.

11. The non-transitory computer-readable storage media of claim 10, wherein determining a respective probabilistic score for each item in the plurality of items is performed in O(kn+mk) time, where k is a size of the factorization vectors $v_i$ and $v_j$, n is a number of features associated with the user in the first feature vector, and m is a number of features associated with the plurality of items.

12. The non-transitory computer-readable storage media of claim 1, wherein generating the first feature vector based on a first set of features associated with a user comprises applying a hash function to key-value pairs of user attributes to map the features to indices in the first feature vector.

13. The non-transitory computer-readable storage media of claim 1, wherein each item includes at least one embedder uniform resource locator that, when selected, results in performance of the target action.

14. The non-transitory computer-readable storage media of claim 1, wherein the target action is at least one of selecting an item, rating an item, downloading an item, or installing an item.

15. The non-transitory computer-readable storage media of claim 1, wherein the web service is at least one of a website or a software-as-a-service application.

16. A system comprising:
one or more hardware processors;
one or more non-transitory computer readable storage media storing instructions which, when executed by one or more hardware processors, causes performance of a set of operations comprising:
receiving training data that identifies a set of actions taken by a plurality of users with respect to a plurality of items;
responsive to receiving the training data, training a prediction model, wherein training the prediction model includes generating, for the prediction model, (a) a linear prediction component of a factorization machine modelling linear relationships, learned from the training data, between features of the plurality of users and the set of actions, and (b) a nonlinear prediction component of the factorization machine modelling nonlinear interactions, learned from the training data, between different features in predicting the set of actions, wherein different learning rates are applied to different model parameters of the linear component of the factorization machine and the nonlinear component of the factorization machine during training;
generating a first feature vector based on a first set of features associated with a user that is currently accessing a particular web service;
for each respective item in a plurality of items:
generating a respective feature vector for the respective item based on a respective set of features associated with the respective item;
determining a respective probabilistic score of the user performing a target action;
wherein the respective probabilistic score for a respective item is computed as a function of (a) the linear prediction component, (b) the nonlinear prediction component, (c) the first feature vector, and (d) the respective feature vector for the respective item;
identifying, based on the probabilistic score for each respective item, a subset of items from the plurality of items to present to the user; and
presenting the subset of items from the plurality of items to the user through an interface of the particular web service.

17. The system of claim 16, wherein the linear model component applies a set of weights based on relationships strengths between the features in contributing to a predicted event outcome.

18. The system of claim 16, wherein the different model parameters include weights for pairwise interactions between features from a feature set including features from the plurality of users and the plurality of items; wherein a weight for a particular interaction between two features in the feature set is computed, at least in part, as a factor of pairwise interactions between other features in the feature set.

19. The system of claim 16, wherein determining the respective probabilistic score comprises generating a first result vector by applying the linear prediction component and the nonlinear prediction component to the first feature vector; caching the first result vector; generating at least a second result vector by applying the linear prediction component and the nonlinear prediction component to the respective feature vector for each respective item; and combining the cached first result vector with at least the second result vector to compute the respective probabilistic score.

20. A method comprising:
- receiving training data that identifies a set of actions taken by a plurality of users with respect to a plurality of items;
- responsive to receiving the training data, training a prediction model, wherein training the prediction model includes generating, for the prediction model, (a) a linear prediction component of a factorization machine modelling linear relationships, learned from the training data, between features of the plurality of users and the set of actions, and (b) a nonlinear prediction component of the factorization machine modelling nonlinear interactions, learned from the training data, between different features in predicting the set of actions, wherein different learning rates are applied to different model parameters of the linear component of the factorization machine and the nonlinear component of the factorization machine during training;
- generating a first feature vector based on a first set of features associated with a user that is currently accessing a particular web service;
- for each respective item in a plurality of items:
  - generating a respective feature vector for the respective item based on a respective set of features associated with the respective item;
- determining a respective probabilistic score of the user performing a target action;
- wherein the respective probabilistic score for a respective item is computed as a function of (a) the linear prediction component, (b) the nonlinear prediction component, (c) the first feature vector, and (d) the respective feature vector for the respective item;
- identifying, based on the probabilistic score for each respective item, a subset of items from the plurality of items to present to the user; and
- presenting the subset of items from the plurality of items to the user through an interface of the particular web service.

* * * * *

UNITED STATES PATENT AND TRADEMARK OFFICE
CERTIFICATE OF CORRECTION

PATENT NO. : 11,574,207 B2
APPLICATION NO. : 15/706471
DATED : February 7, 2023
INVENTOR(S) : Pearmain et al.

It is certified that error appears in the above-identified patent and that said Letters Patent is hereby corrected as shown below:

On the Title Page

Column 2, under item (56) Other Publications, Line 2, delete "ReeSys" and insert -- RecSys --, therefor.

On page 2, Column 1, under item (56) Other Publications, Line 2, delete "Leaderfor" and insert -- Leader for --, therefor.

On page 2, Column 2, under item (56) Other Publications, Line 19, delete "Scienti?c" and insert -- Scientific --, therefor.

In the Specification

In Column 6, Line 67, delete "$P(y|x;\theta)=(h_\theta(x))^y(1-h_\theta(x))^{1-y}$" an insert -- $P(y|x;\theta) = (h_\theta(x))^y (1 - h_\theta(x))^{1-y}$ --, therefor.

In Column 7, Lines 8-9, delete "$L(\theta)=p(\vec{y}|X;\theta)=\prod_{i=1}^{m}p(y^{(i)}|x^{(i)};\theta)=\prod_{i=1}^{m}(h_\theta(x^{(i)}))^{y^{(i)}}(1-h_\theta(x^{(i)}))^{1-y^{(i)}}$" and insert -- $L(\theta) = p(\vec{y}|X;\theta) = \prod_{i=1}^{m} p(y^{(i)}|x^{(i)};\theta) = \prod_{i=1}^{m}(h_\theta(x^{(i)}))^{y^{(i)}}(1-h_\theta(x^{(i)}))^{1-y^{(i)}}$ --, therefor.

Signed and Sealed this
Nineteenth Day of December, 2023

*Katherine Kelly Vidal*

Katherine Kelly Vidal
*Director of the United States Patent and Trademark Office*

CERTIFICATE OF CORRECTION (continued)
U.S. Pat. No. 11,574,207 B2

Page 2 of 2

In Column 8, Line 56, delete "$= \frac{1}{2}\left(\sum_{i=1}^{n}\sum_{j=1}^{n}\sum_{f=1}^{k} v_{i,f}, v_{j,f} x_i x_j - \sum_{i=1}^{n}\sum_{f=1}^{n} v_{i,f}, v_{j,f} x_i x_j\right)$" and insert -- $= \frac{1}{2}(\sum_{i=1}^{n}\sum_{j=1}^{n}\sum_{f=1}^{k} v_{i,f} v_{j,f} x_i x_j - \sum_{i=1}^{n}\sum_{f=1}^{k} v_{i,f} v_{j,f} x_i x_j)$ --, therefor.

In Column 10, Line 64, delete "$\{\vec{\theta}_{t+i} = \vec{\theta}_t - \alpha_t \vec{g}_t\}$" and insert -- $\{\vec{\theta}_{t+1} = \vec{\theta}_t - \alpha_t \vec{g}_t\}$ --, therefor.